OR    4,013,338

United States Patent
Sato et al.

[11] 4,013,338
[45] Mar. 22, 1977

[54] FOURIER TRANSFORM HOLOGRAPHY USING PSEUDO-RANDOM PHASE SHIFTING OF OBJECT ILLUMINATING BEAMS AND APODIZATION

[75] Inventors: Isao Sato; Makoto Kato, both of Kadoma, Japan

[73] Assignee: Matsushita Electric Industrial Company, Limited, Japan

[22] Filed: Jan. 26, 1976

[21] Appl. No.: 652,154

[30] Foreign Application Priority Data

May 13, 1975  Japan .............................. 50-56960

[52] U.S. Cl. ................... 350/3.5; 350/162 SF; 350/314
[51] Int. Cl.$^2$ ......................................... G03H 1/16
[58] Field of Search .............. 350/3.5, 162 SF, 314; 340/173 LT, 173 LM

[56] References Cited
UNITED STATES PATENTS

| | | | |
|---|---|---|---|
| 3,604,778 | 9/1971 | Burckhardt | 350/3.5 |
| 3,716,286 | 2/1973 | St. John | 350/3.5 |
| 3,744,871 | 7/1973 | Takeda et al. | 350/3.5 |
| 3,829,193 | 8/1974 | Tsunoda et al. | 350/3.5 |
| 3,838,904 | 10/1974 | Takeda et al. | 350/3.5 |
| 3,917,380 | 11/1975 | Kato et al. | 350/3.5 |

*Primary Examiner*—Ronald J. Stern
*Attorney, Agent, or Firm*—Robert E. Burns; Emmanuel J. Lobato; Bruce L. Adams

[57] ABSTRACT

A phase mask comprised of a square array of phase shifting areas arranged in pseudo-random pattern is illuminated with a beam of electromagnetic radiation, as a result of which an array of pseudo-randomly phase shifted beams emerges from the phase mask and impinges upon an object transparency to be intensity-modulated thereby and come to a focus on a Fourier transform plane. The power spectrum of the beams distributes in orthogonal directions on the Fourier transform plane from its center maxima in a distinct pattern of series of fringes. The technique of apodization is employed to suppress the fringes to thereby reduce the coherent noise of a hologram to a minimum.

7 Claims, 16 Drawing Figures

FIG. 5a

| 0 | 0 | 0 | $\pi$ | $\pi$ |
|---|---|---|---|---|
| $\pi$ | $\pi$ | $\pi$ | 0 | 0 |
| 0 | 0 | $\pi$ | $\pi$ | 0 |
| 0 | $\pi$ | 0 | $\pi$ | $\pi$ |
| 0 | $\pi$ | $\pi$ | 0 | 0 |

FIG. 5b

| $\frac{\pi}{2}$ | 0 | $\frac{\pi}{2}$ | 0 | $\frac{\pi}{2}$ |
|---|---|---|---|---|
| 0 | $\frac{\pi}{2}$ | 0 | $\frac{\pi}{2}$ | 0 |
| $\frac{\pi}{2}$ | 0 | $\frac{\pi}{2}$ | 0 | $\frac{\pi}{2}$ |
| 0 | $\frac{\pi}{2}$ | 0 | $\frac{\pi}{2}$ | 0 |
| $\frac{\pi}{2}$ | 0 | $\frac{\pi}{2}$ | 0 | $\frac{\pi}{2}$ |

FIG. 6a

| $\frac{3\pi}{2}$ | 0 | $\frac{\pi}{2}$ | 0 | $\frac{\pi}{2}$ | $\pi$ | $\frac{3\pi}{2}$ |

| $\frac{\pi}{2}$ | 0 | $\frac{\pi}{2}$ | $\pi$ | $\frac{3\pi}{2}$ |
|---|---|---|---|---|
| $\pi$ | $\frac{3\pi}{2}$ | $\pi$ | $\frac{\pi}{2}$ | 0 |
| $\frac{\pi}{2}$ | 0 | $\frac{3\pi}{2}$ | $\pi$ | $\frac{\pi}{2}$ |
| 0 | $\frac{3\pi}{2}$ | 0 | $\frac{3\pi}{2}$ | $\pi$ |
| $\frac{\pi}{2}$ | $\pi$ | $\frac{3\pi}{2}$ | 0 | $\frac{\pi}{2}$ |

FIG. 6b

| $\frac{3\pi}{2}$ |
| 0 |
| $\frac{\pi}{2}$ |
| 0 |
| $\frac{\pi}{2}$ |
| $\pi$ |
| $\frac{3\pi}{2}$ |

| $\pi$ | $\frac{3\pi}{2}$ | 0 | $\frac{3\pi}{2}$ | 0 | $\frac{\pi}{2}$ | 0 |
|---|---|---|---|---|---|---|
| $\frac{3\pi}{2}$ | 0 | $\frac{\pi}{2}$ | 0 | $\frac{\pi}{2}$ | $\pi$ | $\frac{3\pi}{2}$ |
| 0 | $\frac{\pi}{2}$ | $\pi$ | $\frac{\pi}{2}$ | $\pi$ | $\frac{3\pi}{2}$ | 0 |
| $\frac{3\pi}{2}$ | 0 | $\frac{\pi}{2}$ | 0 | $\frac{\pi}{2}$ | $\pi$ | $\frac{3\pi}{2}$ |
| 0 | $\frac{\pi}{2}$ | $\pi$ | $\frac{\pi}{2}$ | $\pi$ | $\frac{3\pi}{2}$ | 0 |
| $\frac{\pi}{2}$ | $\pi$ | $\frac{3\pi}{2}$ | $\pi$ | $\frac{3\pi}{2}$ | 0 | $\frac{\pi}{2}$ |
| 0 | $\frac{3\pi}{2}$ | 0 | $\frac{3\pi}{2}$ | 0 | $\frac{\pi}{2}$ | 0 |

FOURIER TRANSFORM HOLOGRAPHY USING PSEUDO-RANDOM PHASE SHIFTING OF OBJECT ILLUMINATING BEAMS AND APODIZATION

The present invention relates generally to Fourier transform hologram recording and image reconstruction and in particular to the recording of the Fourier transform hologram of an array of beams of electromagnetic radiation using a pseudo-random phase shifting mask and the apodization technique to improve the signal-to-noise ratio of the hologram and the reconstructed images.

In a system for recording a Fourier-transform hologram, it is desirable to make the system relatively insensitive to blemishes or dust on the hologram-recording medium so that a small blemish or dust particle on the hologram cannot obscure the reconstructed image or change a bit of digital data.

The use of random phase mask is disclosed in U.S. Pat. No. 3,604,778 issued to Burckhardt. In the prior art phase mask phase shifts of 0° and 180° are randomly interspersed in a pattern of a square array to randomly shift the phase of an incident beam. However, in the Fourier-transform recording of high-density digital data or a continuous tone image, the use of the random phase mask of two phase shift levels creates an objectionable fringe pattern on the reconstructed image because interference occurs between phase shifting squares which adjoin each other with a phase difference of 180°. The use of a random pattern of four levels of of phase shift (0°, 90°, 180°, 270°) may be a possible solution to the reduction of such coherent noise, there is the probability of a phase difference of 180° occurring between orthogonally adjoining phase-shifting areas.

Conventionally, the random phase mask is illuminated with an array of beams formed by an array of circular holes to shift the phase of the passing beams randomly. The phase-shifted beams are focused on the Fourier transform plane where the center maxima or Airy disk of the power spectrum of the beams distributes within an area of a finite size. An analysis shows that if the beams are focused through a circuit aperture placed immediately in front of the Fourier transform plane, e.g. at the hologram plane and the radius of the aperture is brought substantially equal to the radius of the Airy disk, the intensity of the reconstructed sampling pattern fluctuates randomly. This is because the sampled beams are randomly phase-shifted and the spatial frequency spectrum of the phase mask is limited by the finite size of the aperture so that the image areas of the sampled beams become broader and interfere with each other. The diffraction pattern of each sampled beam extends in its image plane to the first-order waves and to further high-order waves and appears as a series of alternate positive and negative fringes with decreasing intensity where it interferes with the fringes of adjacent beams. The randomness of the phase difference between adjacent beams gives rise to random intensity fluctuations, which may result in coherent noise.

Therefore, the primary object of the present invention is to provide a system for recording a Fourier transform hologram which is free from coherent noise.

Another object of the invention is to provide a system for recording a Fourier transform hologram in which a pseudo-randomly phase shifting mask and the technique of apodization are used to reduce the coherent noise to a minimum.

Briefly described, in a recording system of a Fourier transform hologram, the pseudo-random phase mask of the invention is composed of a plurality of phase shifting areas arranged in a pattern of rows and columns such that there is an approximately equal number of phase shifting areas for each of the different phase shifts, wherein the number of different phase shifts is greater than three inclusive and each of the different phase shifts is one of the multiples of $m360°/N$, where N is the number of the different phase shifts, and ranges from 1 to N, and the phase difference between orthogonally adjacent phase shifting areas is $360°/N$. The pseudo-random phase mask when disposed in the path of a light beam imparts pseudo-randomly interspersed phase shifts to the incident beam so that the beam emerges as a plurality of phase-shifted beams for impingement upon an object transparency. The power spectrum of each of the phase-shifted beams on the Fourier transform plane distributes in orthogonal directions from the center maximum of the power spectrum. Consequently, a series of distinct fringes occurs around the center maximum of the power spectrum which tend to interfere with the fringes originated from the adjacent phase shifting areas, thus resulting in fluctuations of light intensity which appear as noise in the final hologram.

A feature of the present invention is the use of the apodization technique in the pseudo-random phase Fourier transform holography in order to suppress the undesirable fringe pattern. Apodization is achieved, for example, by imparting a substantially Gaussian intensity distribution to the pseudo-randomly phase shifted beams. The combined use of the pseudo-random phase mask and the means for apodizing the pseudo-randomly phase shifted beams can effectively eliminate the speckle noise and thus improve the signal-to-noise ratio performance of the system.

These and other objects, features and advantages of the present invention will be understood from the following description taken in conjunction with the accompanying drawings, in which:

FIGS. 5a to 5c are partial views showing a first preferred embodiment of the invention;

FIGS. 6a to 6c are partial views showing an alternative embodiment of the phase mask of FIG. 5;

Figure 1:
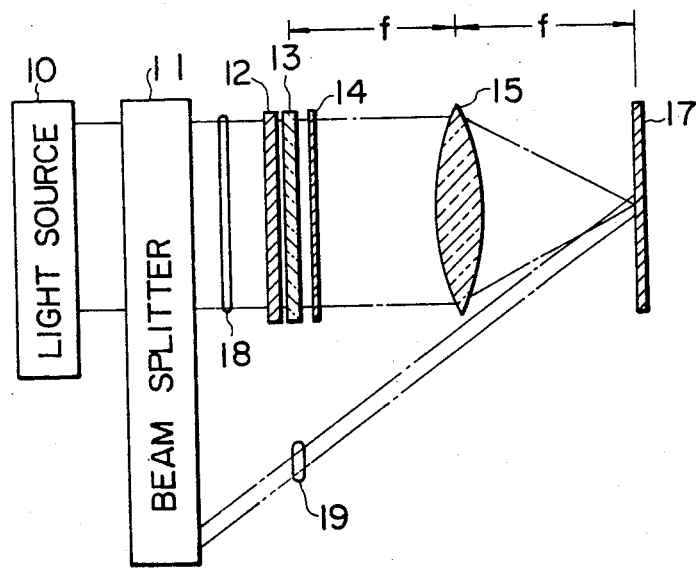
FIG. 1 is an exemplary arrangement for recording a Fourier transform hologram with a pseudo-random phase mask of the invention.

Referring now to FIG. 1 apparatus used in the practice of the present invention is shown and comprises a light source 10, a beam splitter 11, a sampling mask 12 that is comprised of an opaque medium in which there are small square or rectangular transparent areas or apertures, a random phase mask 13, an object transparency 14, a Fourier transform lens 15 located substantially at a focal distance away from sampling mask 12, and a photosensitive recording medium 17 that is located in the rear focal plane, which is also called the Fourier transform plane, of lens 14. The light source 10 may be a conventional laser. The beam splitter 11 splits the light from source 10 into an illuminating beam 18 and a reference beam 19 each having a constant phase relationship to the other and directs these two beams onto the same portion of recording medium 17 at an angle with respect to each other. Consequently, when the apparatus of FIG. 1 is operated, an interference pattern is formed on a particular portion of recording medium 17.

Figure 2:
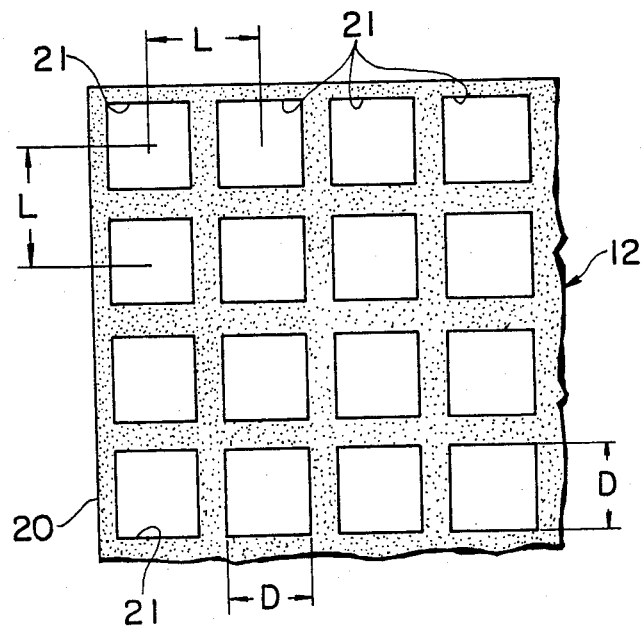
FIG. 2 is a partly enlarged view of a sampling mask used with the arrangement of FIG. 1.

As shown in FIG. 2, the sampling mask 12 bears an array of square apertures 21 on an otherwise opaque medium 20. These apertures are arranged in a pattern of rows and columns so that adjacent apertures are equidistant, their centers being separated by a distance L and their edges having a length D. The mask 12 receives a parallel beam of light and provides an array of sampled beams of light on its output side.

Figure 3:
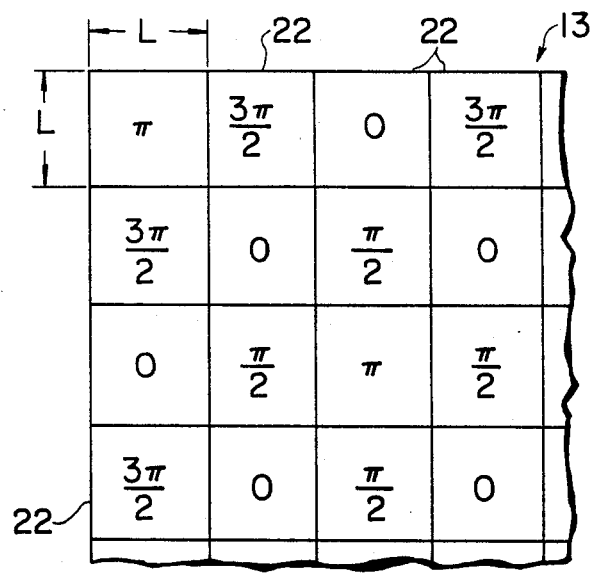
FIG. 3 is an enlarged view of part of the phase mask of the invention.

As shown in FIG. 3, the pseudo random phase mask 13 is comprised of an array of transparent squares 22, the edges of which have a length L that is the same as the spacing between the centers of the equidistant square apertures 21 of mask 12. As indicated by the designation $\pi(=180°)$ in some of the squares 22 of phase mask 13, some of the squares shift the phase of the light transmitted through them by $\pi$ radian with respect to the phase of the light that passes through the squares designated 0. Likewise, the squares labelled $3\pi/2(=270°)$ and $\pi/2(=90°)$ in some other squares in the phase mask provide phase shifts of $3\pi/2$ and $\pi/2$ radians, respectively, with respect to the light that passes through the 0 radian squares. As will be described in detail, there is an approximately equal number of phase shifting squares for each of the different sets of phase shift and these squares are distributed randomly but with a predetermined amount of phase difference, $\pi/2$ in this example, between orthogonally adjoining squares. Otherwise stated, the phase difference between any two orthogonally adjacent squares assumes a constant value. This constant phase relationship between the orthogonally adjacent areas permits the beam to produce a series of alternate positive and negative fringes near the center maxima (or main lobe) of the Fourier spectrum of the phase-shifted beam in parallel to the edges of the phase shifting squares 22.

Figure 4:
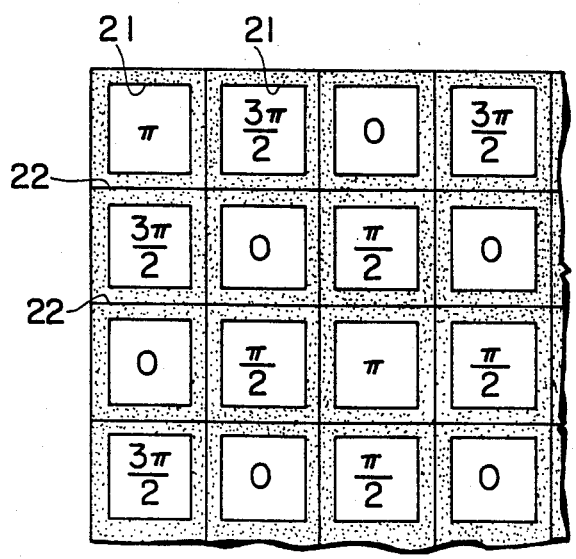
FIG. 4 is an enlarged partial view of the relationship between the sampling mask and the phase mask used in the apparatus of FIG. 1.

In the apparatus of FIG. 1 sampling mask 12 and phase mask 13 are aligned so that light from each square aperture 21 of sampling mask 12 passes through only one square 22 of phase mask 13, so that there is a one-to-one correspondence between the apertures of sampling mask 12 and the phase-shifting areas of phase mask 13. The combination of the two masks is shown in FIG. 4. One-fourth of the sampled beams from sampling mask 12 is phase shifted by $\pi/2$ radian by the particular squares 22 of phase mask 13, another one-fourth undergoes a phase shift of $\pi$ radian, and another one-fourth undergoes a phase shift of $3\pi/2$ radian and the remaining one-fourth of the beams will have a zero phase shift.

The fabrication of such a phase mask is explained with reference to FIGS. 5a to 5c. In FIG. 5a a random phase mask 41 is comprised of a random array of phase shifting squares 42. Approximately one-half of the squares is fabricated to shift the phase of incident light by $\pi$ radian or 180° and these squares are distributed randomly throughout the phase mask 41. Another phase mask 43 shown in FIG. 5b is comprised of a regular array of phase shifting squares 44. Fifty percent of the squares is fabricated to shift the phase of incident light by $\pi/2$ radian and arranged in an orderly manner along each row and column so that the $\pi/2$ radian phase shift occurs alternately with the zero degree shift along the rows and columns. The two phase masks are overlapped so that the squares of each phase mask have a one-to-one correspondence with the squares of the other. This results in phase shifts in which phase shifts of the corresponding squares add up to give a phase mask 45 as shown in FIG. 5. FIG. 5c shows that phase difference between orthogonally adjacent squares is $\pi/2$ radian and there are four different phase shifts (0, $\pi/2$, $\pi$ and $3\pi/2$) of approximately equal number arranged in a pseudo-random fashion throughout the mask 45, since different phase shifts occur at random along each row and column but occur regularly with respect to to the orthogonally adjacent squares such that a constant phase difference exists therebetween. The random phase mask 41 was fabricated with the aid of a random number generator which formed a pattern of approximately equal numbers of opaque and transparent squares randomly interspersed. This pattern was reduced photographically to the scale of the phase mask and was used to etch glass in a well known manner. The regular phase mask 42 was fabricated with a regular pattern of equal number of opaque and transparent squares alternately interspersed, and was fabricated in the same manner as phase mask 41.

An alternative embodiment of the pseudo-random phase mask having pseudo-random phase sequence of four levels (0, $\pi/2$, $\pi$ and ($3\pi/2$) is shown in FIG. 6c. A phase mask 51 comprised of a succession of phase-shifting stripes 52 is shown in FIG. 6a. The phase-shifting stripes are arranged such that they have a phase difference of $\pi/2$ radian between adjacent phase-shifting stripes. In a similar manner, another phase mask 53 (FIG. 6b) is comprised of a succession of phase-shifting stripes 54 bearing the same order of phase sequence as in mask 51, the direction of stripes 54 being normal to the direction of stripes 52 of mask 51. As indicated above, these masks may be prepared by etching a glass substrate to depths which equal to one of the multiples of $\lambda/4(k-1)$ where $\lambda$ is the wave-length of incident light, and k, the refractive index of the substrate. The phase masks 51 and 52 were overlapped together so that a square array of phase-shifting squares 56 resulted in a phase mask 55 shown in FIG. 6c. Each of the squares 56 bears a phase shift which is the sum of phase shifts on the corresponding portion of the intersecting stripes 52 and 54. It will be noted that each of the phase-shifting areas on the mask 55 has a phase difference of $\pi/2$ radian with respect to the orthogonally adjacent squares. In FIG. 6a and 6b, the one-dimensional series of phase shifts randomly varies by the amount of $+\pi/2$ or $-\pi/2$ in the order of occurrence as one sees it from left to right or vice versa and the probability of the occurrence of positive and negative signs (or increment and decrement of phase shift) is approximately ½. The 50 percent probability of the occurrence of the positive and negative signs can be obtained by the use of two-valued random numbers generated by a random number generator. It is understood that a pair of one-dimensional pseudo-random phase sequences can be converted into a two-dimensional array of pseudo-random phase shifts by the two-dimensional summation of intersecting phase shifts.

Phase mask 55 was then aligned with the sampling mask 12 of FIG. 2 so that the phase shifting squares 56 are in registry with the transparent squares 21 of sampling mask 12. Thus, they looked like the the one shown in FIG. 3 which illustrates the top-left corner of the combination of sampling and phase masks 12 and 55. Such combination is advantageously termed a light diffuser because it is capable of diffusing the wavefront or phase of the incident beam to provide uniform distribution of zero-order diffracted wavefronts. The light diffuser was placed in the front focal plane of the Fourier-transform lens 33 and a photosensitive medium was placed on the rear focal plane, or Fourier transform plane 34, of lens 33. It is to be noted that the sampling mask may be dispensed with if the center maxima is to be confined to an area of a minimum size determined by the center-to-center spacing of the phase shifting squares.

To record a Fourier transform hologram of the sampled, phase-shifted, apodized beams on a particular portion of recording medium 17, coherent light is directed from source 10 to beam splitter 11 where it is deflected and formed into the illuminating beam 18 and the reference beam 19. Illuminating beam 18, which is a beam of parallel light is directed onto the Fourier transforming lens 15 through sampling mask 12, phase mask 13 and object transparency 14. The lens 15 focuses the beam onto the desired portion of recording medium 17 located in the rear focal plane, or Fourier transform plane, of lens 15. Consequently, an array of information bearing light beams 20 is formed representative of the image density of the object transparency 14. Simultaneously, reference beam 19 is directed onto the same portion of recording medium 17, and because beams 18 and 19 are coherent and have a constant phase relationship, the two beams form an interference pattern that is recorded as a pseudo-random phase Fourier transform hologram on medium 17. If each hologram is recorded on only a small area of medium 17, it may be preferable to use a mask to define the area of recording medium 17 to record an image corresponding to the center maximum of the power spectrum. It is apparent that the Fourier transforming lens 15 may be located in front of the sampling mask 12 to illuminate it with a converging beam of light so far as the recording medium 17 is located in the Fourier transform plane of lens 15. In addition, there are alternative ways of arranging the phase mask with the sampling mask because it is only necessary that the phase mask be positioned so that the phase of incident beams can be shifted a constant amount. For example, the phase mask can be positioned immediately in front of the sampling mask instead of behind the sampling mask as shown in FIG. 1.

The present invention contemplates the use of apodization in Fourier holography in which the pseudo-random phase mask as referred to above is employed. Apodization is known in the art of optics as a means of suppressing a series of fringes arising at the edges of an object when illuminated by an object when illuminated by a coherent beam. Since the power spectrum of the phase shifted beams distributes in orthogonal directions with a distinct pattern of fringes, the use of apodization can effectively suppress the fringes arising from the use of the pseudo-random phase mask 12.

Figure 7:
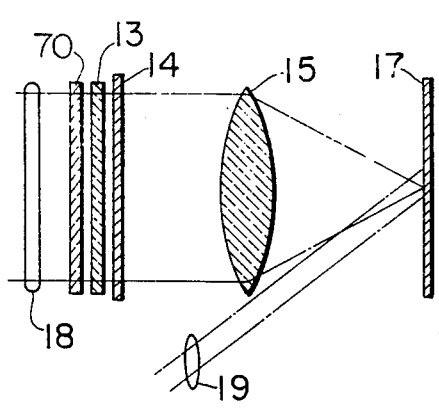
FIG. 7 is an arrangement of the invention in which an apodized sampling mask is shown disposed in front of a pseudo-random phase mask.

Apodization of such Fourier holography can be realized in various ways. In one form of the invention, an apodized sampling mask 70 is placed in front of the pseudo-random phase mask 13 as shown in FIG. 7 in which similar parts are designated by similar numbers used in FIG. 1. The apodized sampling mask 12 is prepared by subjecting a photographic film to a flood light through a sampling pattern constructed in the same way as the one shown in FIG. 2 and further through a filter having a substantially Gaussian distribution of light transmission. The photographic film when developed bears a replica of the sampling pattern of FIG. 2 and each of its sampling apertures 22 has a light transmission characteristic of Gaussian distribution. Each of the sampled beams as it emerges from each of the apodized sampling apertures of the mask 70 has therefore an intensity distribution in which the light intensity is at a maximum along its axis and decays as the distance from the center axis increases following the curve of Gaussian distribution. The pseudo-random phase mask 13 is thus impinged upon by the apodized, sampled beams. It is to be noted that such apodized sampling mask can be arranged on either side of the pseudo-random phase mask 13 provided that these masks are positioned in close proximity to each other.

Figure 8:
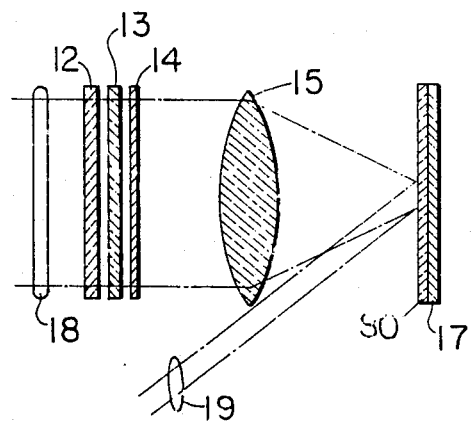
FIG. 8 is an alternative arrangement of the invention in which an apodizing filter is shown disposed in front of a Fourier transform plane.

An alternative way of apodization involves the use of an apodizing filter having a substantially Gaussian distribution of light transmission. Such apodizing filter is shown disposed in front of the recording medium 17 in FIG. 8 and designated by reference numeral 80. In FIG. 8, the sampling mask 12 is constructed substantially the same as the sampling mask of FIG. 2, but not apodized and placed in front of the pseudo-random phase mask 13. The sampled, phase-shifted beams come to a focus on the Fourier transform plane on the recording medium 17 through the apodizing filter 17a. The system is thus apodized and undesirable higher order wavefronts which would otherwise appear as a series of fringes surrounding the center maxima are effectively suppressed.

Figure 9:
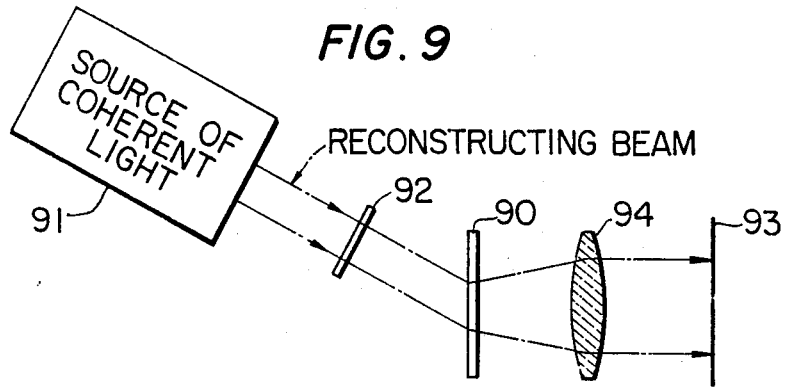
FIG. 9 is a further alternative arrangement of a Fourier hologram reconstructing system in which an apodizing filter is shown disposed in the path of a coherent light beam.

Apodization of the Fourier transform holography using the pseudo-random phase mask of the invention can also be effected in an image reconstruction process as shown in FIG. 9. In FIG. 9, a Fourier transform hologram 90 which is a record of the interference of the wavefronts of the beam 18 through the pseudo-random phase mask 13 and the reference beam 19, is subjected to a reconstructing beam emitted from a source 91 of coherent light through an apodizing filter 92 whose light transmission characteristic has a Gaussian distribution curve. The reconstructing beam is thus apodized and impinges on the hologram 90 at a predetermined angle which permits reconstruction of the image on the hologram 90 on the plane 93 by lens 94. Alternatively, the apodizing filter 92 may be dispensed with if the source 91 emits a light beam whose light intensity has a Gaussian distribution characteristic.

Figure 10A:
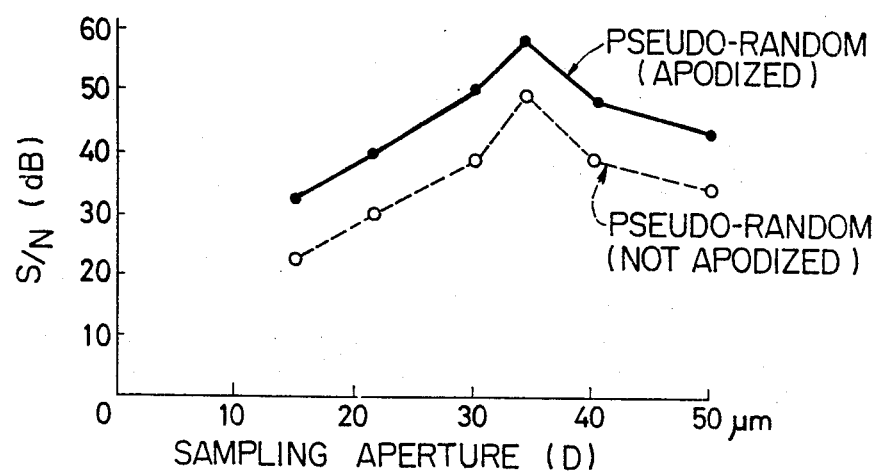
FIG. 10a is a graph showing the signal-to-noise ratio versus sampling aperture size relation for comparison of the apodized and non-apodized pseudo-random phase Fourier transform holograms.

The effect of the use of apodization on the pseudo-random Fourier transform hologram was analyzed in terms of signal-to-noise ratio represented by the equation $20 \log (I_o/\Delta I)$, where $I_o$ is an average value of light intensity over the surface of the hologram and $\Delta I$ is the standard deviation of intensity fluctuations which appear in the data as noise. In FIG. 10a the signal-to-noise ratio of the apodized pseudo-random phase Fourier hologram is represented by the solid line curve, while that of the non-apodized pseudo-random phase hologram is represented by the broken line curve. The signal-to-noise ratio is plotted against various aperture size (D) of the sampling mask 12, while the hologram size is held constant at 2 mm. FIG. 10a clearly indicates that the apodization has improved the signal-to-noise ratio by approximately 10 dB over the range of sampling apertures from 15 to 50 $\mu$m.

Figure 10B:
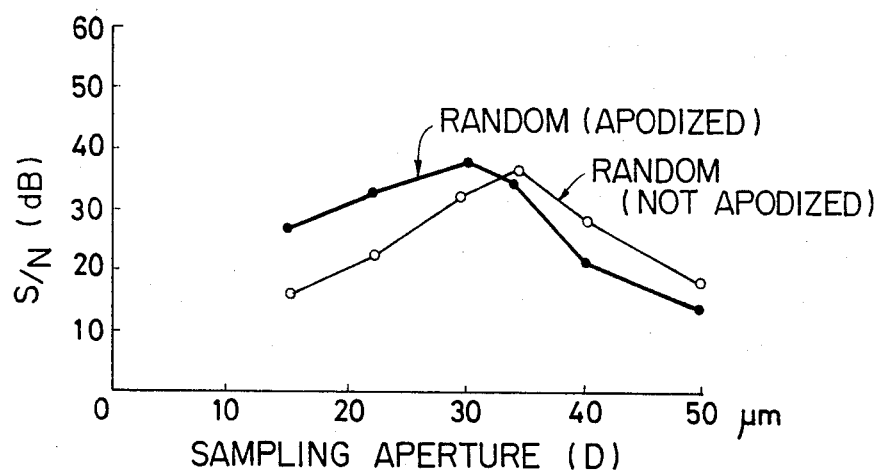
FIG. 10b is a graph showing the signal-to-noise ratio versus sampling aperture size relation for comparison of the apodized and non-apodized prior art random phase Fourier transform holograms.

Similar analysis was made to determine the effect of the apodization technique on a Fourier transform hologram using prior art random phase mask as previously referred to. FIG. 10b shows the effect of apodization on the prior art random phase Fourier transform hologram and indicates that the signal-to-noise ratio of the apodized one is only better than the non-apodized in the aperture range of from 15 to 30 $\mu$m.

Figure 11:
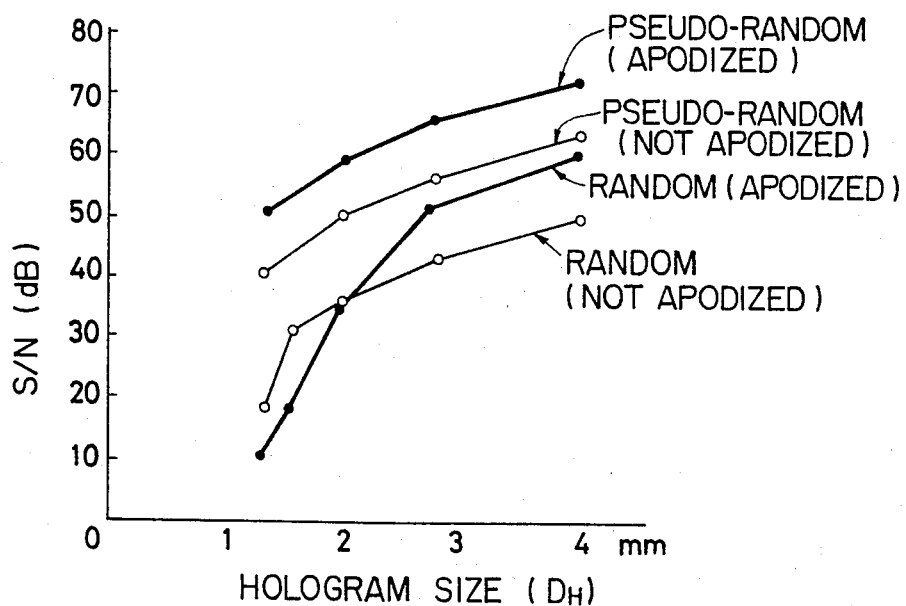
FIG. 11 is a graph showing the signal-to-noise ratio versus hologram size relation for comparison of the apodized, non-apodized, pseudo-random and prior art random phase Fourier transform holograms.

The improvement of pseudo-random phase Fourier holography in terms of signal-to-noise ratio is further evidenced by similar analysis in which the signal-to-noise ratio is plotted against various hologram sizes as shown in FIG. 11.

It may be noted from the above that in order to achieve maximum signal-to-noise performance it is only necessary that the pseudo-random phase Fourier holography as a whole be apodized.

In another aspect of the invention, an analysis was made to determine the optimum size of the aperture of the sampling mask 12. It is known that the sampling apertures 22 have the effect of restricting the spatial frequency range of the light passing therethrough as the frequency of an electrical signal would be affected by the bandwidth of a bandpass filter as it passes therethrough. As indicated in FIG. 10a, the optimum aperture size is found to exist at the value of 32.5 $\mu$m, when the wavelength $\lambda$ of the light is 0.4888 $\mu$m, the focal length $f$ at 70 mm, the center-to-center spacing L of the sampling mask 12, 50 $\mu$m, and the edge of a square hologram $D_H$, 2.0 mm.

It was shown that the following mathematical formula should be satisfied to provide a maximum signal-to-noise ratio performance:

optimum aperture size $(D_{oM}) = (2 \cdot \lambda \cdot f / D_H)$

What is claimed is:

1. A system for forming a hologram of an array of beams of electromagnetic radiation on a Fourier transform plane, comprising:
a pseudo-random phase mask receptive in use of a beam of electromagnetic radiation and comprised of a plurality of phase shifting areas arranged in a pattern of rows and columns, there being an approximately equal number of phase shifting areas for each of the different phase shifts, wherein the number of different phase shifts is N which is greater than three inclusive and each of the different phase shifts is one of the multiples of m360°/N, where m ranges from 1 to N, and the phase difference between orthogonally adjacent phase shifting areas is 360°/N, whereby the power spectrum of each of said phase-shifted beams on the Fourier transform plane distributes in orthogonal directions from the center maximum of the power spectrum;
means for apodizing the phase-shifted beams; and
means for recording a Fourier transform hologram of said phase-shifted, apodized beams.

2. A system as claimed in claim 1, wherein said apodizing means comprises an aperture mask comprised of an array of apertures having one-to-one correspondence with the phase shifting areas of said phase mask, each of said apertures having a substantially Gaussian light transmission characteristic to impart a Gaussian intensity distribution to a beam passing therethrough.

3. A system as claimed in claim 2, wherein each of said apertures is square shaped and wherein the length of the edges thereof is equal to $2\lambda f/D_H$, wherein $\lambda$ is the wavelength of the beam, $f$ is the focal length of a Fourier transform lens disposed between the pseudo-random phase mask and the recording means, and $D_H$ is the length of edges of said Fourier transform hologram.

4. A system as claimed in claim 1, wherein said apodizing means is a filter disposed in front of said recording means.

5. A system as claimed in claim 1, wherein each of said phase shifting areas has a phase difference of 90° with respect to orthogonally adjacent areas and phase differences of one of 0° and 180° with respect to orthogonally adjacent areas which adjoin the first mentioned orthogonally adjacent areas remote from said each of phase shifting areas.

6. A method for reconstructing a Fourier transform hologram, wherein said hologram is prepared by a method comprising the steps of directing a beam of electromagnetic radiation to a pseudo-random phase mask comprised of a plurality of phase shifting areas arranged in a pattern of rows and columns, there being an approximately different phase shifts, wherein the number of different phase shifts is N which is greater than three inclusive and each of the different phase shifts is one of the multiples of $m360°/N$, where $m$ ranges from 1 to N, and the phase difference between orthogonally adjacent phase shifting areas is 360°/N, to produce a plurality of phase-shifted beams, placing an object transparency behind the phase mask in the direction of the beam to intensity-modulate the phase-shifted beams, subjecting a recording medium to the intensity-modulated, phase-shifted beams and directing a reference beam to said recording medium to produce an interference fringe pattern with said intensity-modulated, phase-shifted beams, said method comprising:
directing a beam of electromagnetic radiation to said hologram, said beam having a uniform intensity distribution across the transverse cross-section thereof; and
placing an apodization filter in the path of said beam to impart a substantially Gaussian intensity distribution to said beam.

7. A method for reconstructing a Fourier transform hologram, wherein said hologram is prepared by a method comprising the steps of directing a beam of electromagnetic radiation to a pseudo-random phase mask comprised of a plurality of phase shifting areas arranged in a pattern of rows and columns, there being an approximately equal number of phase shifting areas for each of the different phase shifts, wherein the number of different phase shifts is N which is greater than three inclusive and each of the different phase shifts is one of the multiples of $m360°/N$, where $m$ ranges from 1 to N, and the phase difference between orthogonally adjacent phase shifting areas is $360°/N$, to produce a plurality of phase-shifted beams, placing an object transparency behind the phase mask in the direction of the beam to intensity-modulate the phase-shifted beams, subjecting a recording medium to the intensity-modulated, phase-shifted beams and directing a reference beam to said recording medium to produce an interference fringe pattern with said intensity-modulated, phase-shifted beams, said method comprising, directing a beam of electromagnetic radiation to said hologram, said beam having a substantially Gaussian intensity distribution across the transverse cross-section thereof.

* * * * *